United States Patent
Lidgi et al.

(10) Patent No.: US 12,452,293 B1
(45) Date of Patent: Oct. 21, 2025

(54) DETECTION OF STALE DATA OBJECTS AND ASSOCIATED CYBERSECURITY RISK

(71) Applicant: Wiz, Inc., New York, NY (US)

(72) Inventors: Matilda Lidgi, Haifa (IL); Liron Levin, Kfar Saba (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/070,154

(22) Filed: Mar. 4, 2025

(51) Int. Cl.
*H04L 9/40* (2022.01)
*G06F 9/455* (2018.01)

(52) U.S. Cl.
CPC ...... *H04L 63/1433* (2013.01); *G06F 9/45558* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 11,153,331 B2 | 10/2021 | Zou et al. | |
| 11,775,640 B1 * | 10/2023 | Sathe | H04L 63/1416 726/24 |
| 2014/0149354 A1 * | 5/2014 | Chan | G06F 9/455 707/639 |
| 2014/0359091 A1 * | 12/2014 | Senniappan | H04L 41/122 709/221 |
| 2016/0285906 A1 * | 9/2016 | Fine | G06F 9/45558 |
| 2017/0147399 A1 * | 5/2017 | Cropper | G06F 9/45533 |
| 2021/0216345 A1 * | 7/2021 | Natu | G06F 3/061 |
| 2022/0407907 A1 * | 12/2022 | Cheng | H04L 67/02 |
| 2023/0176886 A1 * | 6/2023 | Lal | G06F 9/505 718/1 |
| 2024/0273203 A1 | 8/2024 | Raca et al. | |

* cited by examiner

*Primary Examiner* — Joseph P Hirl
*Assistant Examiner* — Hassan Saadoun
(74) *Attorney, Agent, or Firm* — M&B IP Analysts, LLC (57) ABSTRACT

A system and method for detecting stale objects in a cloud computing environment is presented. The method includes detecting a plurality of resources deployed in a cloud computing environment; generating for each resource a representation in a security database, the security database including a representation of the cloud computing environment; generating for each resource a state, based at least on a detected utilization of a respective resource; detecting, based on the state, a resource of the plurality of resources which is an underutilized resource; and initiating a mitigation action on the underutilized resource.

19 Claims, 4 Drawing Sheets

DETECTION OF STALE DATA OBJECTS AND ASSOCIATED CYBERSECURITY RISK

TECHNICAL FIELD

The present disclosure relates generally to cybersecurity and specifically to reducing vulnerability in cloud computing environments.

BACKGROUND

A stale data object refers to outdated or obsolete data that remains stored in a system even though it is no longer actively used or maintained. This can occur due to improper data management, lack of regular updates, or retention of old files, databases, or cached information.

In cybersecurity, stale data objects pose significant risks. They often contain sensitive information that attackers can exploit if left unprotected. Since they are no longer actively monitored, these objects may not receive necessary security updates, making them vulnerable to unauthorized access, data breaches, or malware injection. Additionally, stale credentials or outdated encryption keys can provide attackers with a backdoor into systems, leading to unauthorized data exposure or privilege escalation.

If stale data persists in cloud environments, former employees or third parties might still have access, increasing the risk of insider threats. Attackers can also use stale data to perform reconnaissance, gathering information that aids in more sophisticated attacks. Detecting stale data objects is a challenge, as is providing a solution thereto.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a plurality of resources deployed in a cloud computing environment. The method may also include generating for each resource a representation in a security database, the security database including a representation of the cloud computing environment. The method may furthermore include generating for each resource a state, based at least on a detected utilization of a respective resource. The method may in addition include detecting, based on the state, a resource of the plurality of resources which is an underutilized resource. The method may moreover include initiating a mitigation action on the underutilized resource. Other embodiments of this aspect include corresponding computer systems, apparatus, and computer programs recorded on one or more computer storage devices, each configured to perform the actions of the methods.

Implementations may include one or more of the following features. The method may include: generating in the security database an edge connecting a first representation to a second representation, based on at least a detected permission. The method may include: detecting the underutilized resource in the security database based on a number of edges of a representation of the underutilized resource. The method may include: detecting a group of representations in the security database where each representation of the group is not connected to a representation outside of the group; and detecting the underutilized resource in the group of representations. The method may include: determining that a number of representations in the group of representations is below a first threshold; and determining that each resource represented in the group of representations is an underutilized resource. The method may include: initiating a mitigation action on each resource represented in the group of representations. The method may include: detecting an utilization of a resource based on an event log, the event log including a plurality of events, each event stored as a data record, at least a portion of which include an identifier of a resource. The method may include: initiating the mitigation action to deprovision the underutilized resource. The method may include: initiating the mitigation action to disable a permission associated with a principal of the resource. The method may include: initiating the mitigation action to move the underutilized resource to a second computing environment. Implementations of the described techniques may include hardware, a method or process, or a computer tangible medium.

In one general aspect, a non-transitory computer-readable medium may include one or more instructions that, when executed by one or more processors of a device, cause the device to: detect a plurality of resources deployed in a cloud computing environment; generate for each resource a representation in a security database, the security database including a representation of the cloud computing environment; generate for each resource a state, based at least on a detected utilization of a respective resource; detect, based on the state, a resource of the plurality of resources which is an underutilized resource; and initiate a mitigation action on the underutilized resource. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a plurality of resources deployed in a cloud computing environment. The system may in addition generate for each resource a representation in a security database, the security database including a representation of the cloud computing environment. The system may moreover generate for each resource a state, based at least on a detected utilization of a respective resource. The system may also detect, based on the state, a resource of the plurality of resources which is an underutilized resource. The system may furthermore initiate a mitigation action on the underutilized resource. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate in the security database an edge connecting a first representation to a second representation, based on at least a detected permission. The system where the memory contains further instructions which when executed by the processing circuitry further configures the system to: detect the underutilized resource in the security database based on a number of edges of a representation of the underutilized resource. The system where the memory contains further instructions which when executed by the processing circuitry further configures the system to: detect a group of representations in the security database where each representation of the group is not connected to a representation outside of the group; and detect the underutilized resource in the group of representations. The system where the memory contains further instructions which when executed by the processing circuitry further configures the system to: determine that a number of representations in the group of representations is below a first threshold; and determine that each resource represented in the group of representations is an underutilized resource. The system where the memory contains further instructions which when executed by the processing circuitry further configures the system to: initiate a mitigation action on each resource represented in the group of representations. The system where the memory contains further instructions which when executed by the processing circuitry further configures the system to: detect an utilization of a resource based on an event log, the event log including a plurality of events, each event stored as a data record, at least a portion of which include an identifier of a resource. The system where the memory contains further instructions which when executed by the processing circuitry further configures the system to: initiate the mitigation action to deprovision the underutilized resource. The system where the memory contains further instructions which when executed by the processing circuitry further configures the system to: initiate the mitigation action to disable a permission associated with a principal of the resource. The system where the memory contains further instructions which when executed by the processing circuitry further configures the system to: initiate the mitigation action to move the underutilized resource to a second computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
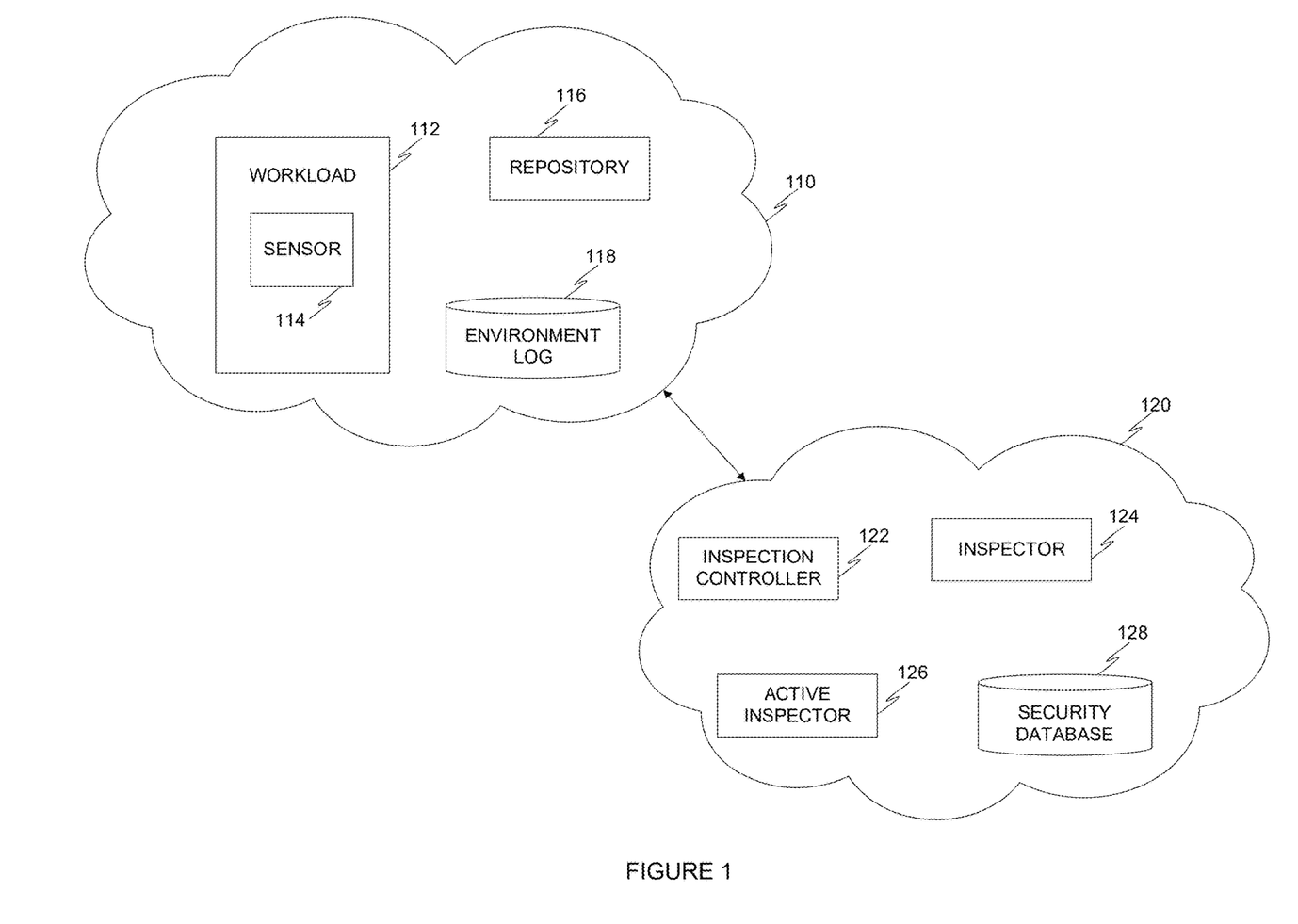
FIG. 1 is an example schematic diagram of a computing environment and an inspection environment, implemented in accordance with an embodiment.

FIG. 1 is an example schematic diagram of a computing environment and an inspection environment, implemented in accordance with an embodiment. In an embodiment, a computing environment 110 includes a plurality of resources, a plurality of principals, a combination thereof, and the like. According to an embodiment, a computing environment 110 is a cloud computing environment, an on-prem computing environment, a hybrid computing environment, a networked computing environment, a combination thereof, and the like.

For example, a cloud computing environment includes a virtual private cloud (VPC), a virtual network (VNet), a virtual private network (VPN), a combination thereof, and the like. In an embodiment, the cloud computing is implemented on a cloud computing infrastructure, such as Amazon® Web Services (AWS), Google® Cloud Platform (GCP), Microsoft Azure, and the like. In an embodiment, the computing environment 110 includes multiple computing environments, including a portion of which are implemented on a first cloud computing infrastructure, and a portion of which are implemented on a second cloud computing infrastructure.

In some embodiments, a resource is a computing entity which exposes a hardware resource (e.g., a processing circuitry, a memory, a storage, etc.), a virtual resource, an action, and the like, in the computing environment. For example, according to an embodiment, a workload 112 is a resource. In an embodiment, a workload 112 is a virtualization, such as a virtual machine, a software container, a serverless function, a nested virtualization, a combination thereof, and the like.

In an embodiment, a virtual machine is implemented utilizing Oracle® VirtualBox®, a software container is deployed on a Kubernetes® platform, and a serverless function is implemented utilizing Amazon Lambda®.

According to an embodiment, the workload 112 includes a sensor 114 deployed thereon. In an embodiment, a sensor 114 is a software application executed in kernel space. In some embodiments, the sensor 114 is configured to detect events, processes executed on the workload 112, network interface requests, runtime execution data, a combination thereof, and the like. In an embodiment, the sensor 114 is configured to apply a detection rule on an event. In some embodiments, the sensor 114 is configured to send a detection, runtime execution data, a combination thereof, and the like, to an inspection environment 120.

In certain embodiments, the computing environment 110 further includes a repository 116. In an embodiment, the repository 116 is a code repository, a software image repository, a version control system (VCS), a combination thereof, and the like. In some embodiments, the computing environment 110 is configured to provision resources of the computing environment 110 to deploy a virtualization (such as the workload 112) in the computing environment 110 based on a code object, a software image, and the like, which is stored in the repository 116. In an embodiment, a VCS utilizes, for example, a Git® platform.

In some embodiments, the computing environment 110 includes an environment log 118. In an embodiment, the environment log 118 includes access events between workloads, resources, principals, and the like, in the computing environment 110. For example, in an embodiment, a principal (e.g., a user account) accesses the workload 112, and an event record is stored in the environment log 118 to indicate the access event.

In an embodiment, the computing environment is monitored by an inspection environment 120. In some embodiments, the inspection environment 120 is implemented as a cloud computing environment, a hybrid computing environment, etc. In an embodiment, a portion of the inspection environment 120 is implemented in the computing environment 110, and a portion of the inspection environment 120 is implemented externally to the computing environment 110. According to an embodiment, the inspection environment 120 is implemented entirely externally to the computing environment 110, with access provided to a principal of the inspection environment 120 to the computing environment 110.

According to an embodiment, the inspection environment 120 includes an inspection controller 122, an inspector 124, an active inspector 126, a security database 128, a combination thereof, and the like. In an embodiment, the inspection controller 122 is configured to initiate inspection of the computing environment 110.

In some embodiments, the inspection controller 122 is configured to detect a plurality of resources deployed in the computing environment 110 and initiate inspection for the resources. For example, in an embodiment, the inspection controller 122 is configured to access an API of a cloud computing environment to receive a list of resources deployed therein. In an embodiment, inspection is initiated by the inspection controller 122 periodically for each resource in the list of resources.

In an embodiment, the inspection controller 122 is configured to provision an inspector 124 to inspect a virtualization deployed in the computing environment 110. In some embodiments, the inspector 124 is configured to inspect a workload 112 for a cybersecurity object. In an embodiment, a cybersecurity object is a code object, a file, a filesystem, a folder, an application, a secret, a cryptographic key, a cloud key, a certificate, a password, a binary, a library, a registry, a combination thereof, and the like. In an embodiment, the cybersecurity object indicates a cybersecurity threat. In some embodiments, a plurality of detected cybersecurity objects indicate together a cybersecurity threat.

In certain embodiments, the inspection controller 122 is configured to detect a disk, for example, associated with the workload 112, and generate an inspectable disk based on the disk of the workload 112. In an embodiment, an inspectable disk is a cloned disk, a snapshot of a disk, a copy of a disk, a combination thereof, and the like. In some embodiments, a snapshot of a disk requires that a volume is generated based on the snapshot prior to inspection, whereas a cloned disk is available practically instantaneously for inspection. In an embodiment, an inspector 124 is configured to perform static analysis of an inspectable disk, perform static analysis on code objects, a combination thereof, and the like.

According to an embodiment, the inspection controller 122 is configured to detect network paths in the computing environment 110. For example, in an embodiment, the inspection controller 122 is configured to detect a network path between a workload 112 and another workload (not shown) in the computing environment 110. In some embodiments, the inspection controller is configured to detect a network path between the workload 112 and an external network, which is not a part of the computing environment 110.

In an embodiment, a network path includes representations of hardware resources, virtual resources, network components, gateways, firewalls, load balancers, IP addresses, proxy servers, web servers, API endpoints, a combination thereof, and the like. In an embodiment, the network path further includes a connection (represented, for example, by an edge in a security graph) between a first workload and a second workload. In some embodiments, the connection type indicates a permission, an access, etc.

In certain embodiments, an active inspector 126 is configured to actively inspect a resource, for example through an external network. In an embodiment, active inspection includes generating a network access instruction which, when executed over a network path, results in an outcome, such as a success or failure. For example, in an embodiment, a network access instruction is an Internet Control Message Protocol (ICMP) command, a hypertext transfer protocol (HTTP) command, a combination thereof, and the like. In some embodiments, the network access instruction includes an IP address, a port, a credential, a username, a password, a combination thereof, and the like.

According to an embodiment, results of an inspection (e.g., detected cybersecurity objects), results of an active inspection, results of network discovery, a combination thereof, and the like, are stored in a security database 128. In some embodiments, the security database 128 includes a representation of the computing environment 110. In an embodiment, the security database 128 stores the representation of the computing environment 110 based on a unified data schema.

In some embodiments, a unified data schema includes a mapping from a plurality of data schemas, for example each data schema corresponding to a unique cloud computing environment (e.g., AWS, GCP, etc.), such that a virtual machine from AWS and a virtual machine from GCP are both represented utilizing the same unified data schema.

In an embodiment, the security database 128 is implemented as a graph database, such as Node4j®, which stores thereon a security graph. In some embodiments, the security graph includes nodes and edges, wherein a node represents, for example, a computing entity (e.g., cloud entity), and an edge represents a type of connection, relationship, and the like, between the two nodes connected by the edge.

In certain embodiments, the security database 128 includes representations of objects in the computing environment 110 which are not connected to other objects, which are connected to few objects, which are rarely accessed, which are never accessed, etc. Detecting such objects allows to deprovision the resources allocated to these objects.

For example, in an embodiment, the security database 128 is queried to detect a representation which is connected only to another representation, only to a predetermined number of representations, etc. In some embodiments, a state is generated for a representation. In an embodiment, the state is generated based on the environment log 118.

In some embodiments, an environment log 118 is a network log, a cloud log, an event log, a runtime execution data log, a combination thereof, and the like. In certain embodiments, a log is implemented utilizing, for example, CloudTrail™. In an embodiment, a state of an entity is determined based on an identifier of the entity detected in certain events, records, etc., in the environment log 118.

According to an embodiment, a state includes a recent event related to the entity, a baseline of behavior generated based on a plurality of event records in the environment log 118, a combination thereof, and the like. For example, in an embodiment, a baseline of access to a resource is generated based on access events which include an identifier of the resource (such as a name from a namespace).

In certain embodiments, the security database 128 is utilized to detect stale objects. According to an embodiment, a stale object is a data object, a resource, a principal, a cloud entity, and the like, which is utilized less than a predetermined threshold. In some embodiments, a cybersecurity risk is determined for a stale data object.

For example, a stale object may be a data object stored in a bucket of a cloud computing environment which is utilized less than a predetermined amount. As a further example, utilization includes actual use, i.e., excluding use such as maintenance, which can be utilized, e.g., by a cloud provider, for maintaining a database which is not otherwise utilized by user accounts of the computing environment 110.

In various embodiments, a stale object is a data object stored in a bucket which nothing in the computing environment 110 points to. Such a data object is not utilized by the computing environment 110, and as such is considered a stale object, according to an embodiment.

In an embodiment, a cybersecurity risk is determined for a stale object. In some embodiments, the cybersecurity risk is further determined based on a type of object, for example, a stale data object that includes sensitive data, such as PII (personal identifiable information) poses a higher cybersecurity risk than a stale data object that includes names of cities. In an embodiment, a cybersecurity risk is assigned a risk score. In some embodiments, the risk score is quantitative, qualitative, a combination thereof, and the like. For example, in an embodiment, a quantitative score ranges from 0 to 10, a qualitative score ranges from 'low' to 'high', etc.

Figure 2:
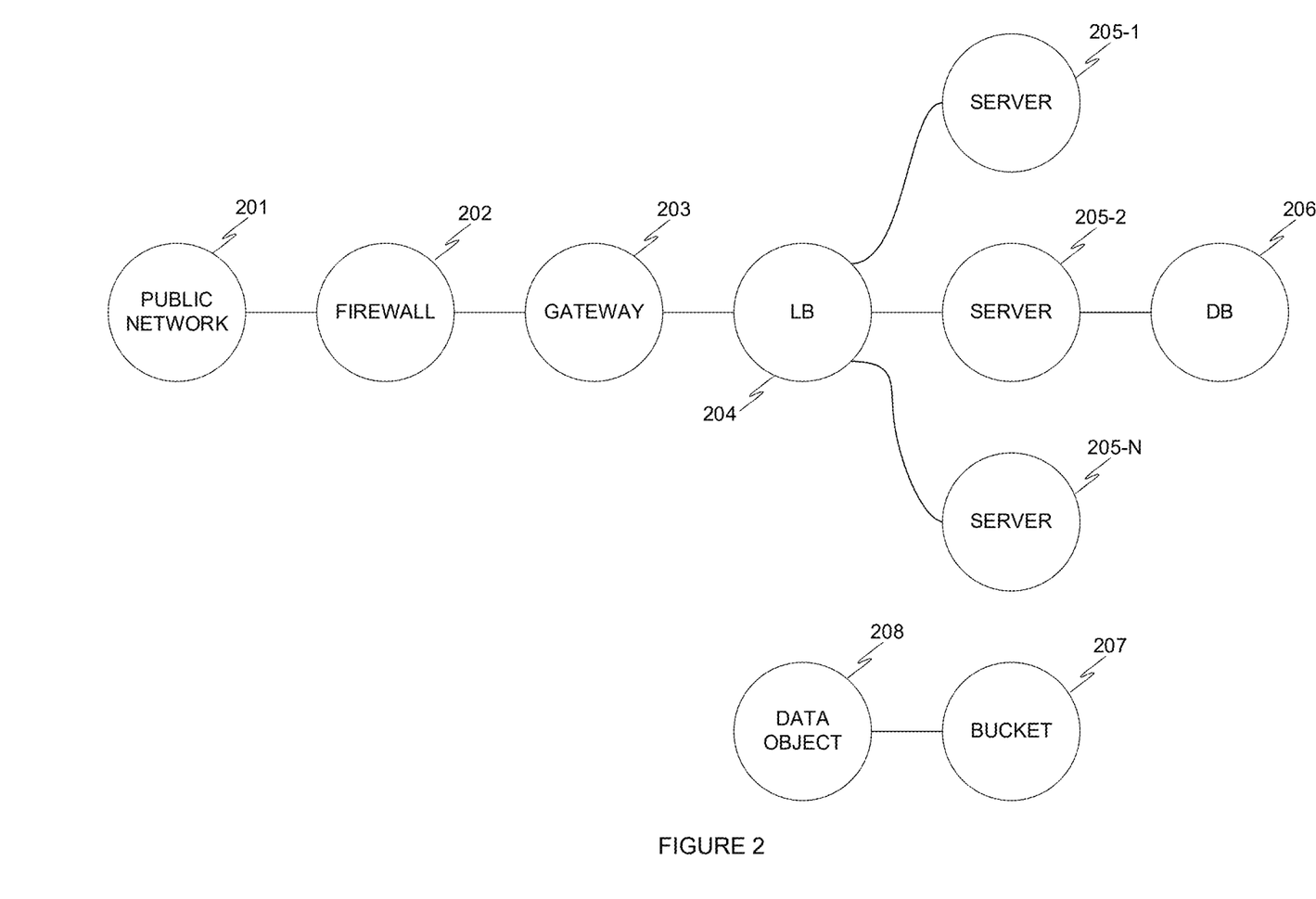
FIG. 2 is an example security graph representation of a computing environment stored in a security database, implemented according to an embodiment.

FIG. 2 is an example security graph representation of a computing environment stored in a security database, implemented according to an embodiment. In an embodiment, a security database is implemented as a graph database, which stores thereon a security graph. In an embodiment, network discovery is initiated for a cloud computing environment, such as the computing environment 110 of FIG. 1 above.

In some embodiments, a security graph is populated with nodes and edges based on detections, findings, enrichments, and the like, from inspecting the computing environment. In an embodiment, a firewall is detected in the computing environment, and a firewall node 202 is generated in the security graph. The firewall node 202 is connected via an edge to a public network node 201, which represents a public network, such as the Internet, that is external to the computing environment of the firewall.

According to an embodiment, the public network node 201 is an enrichment node, and a connection between the firewall node 202 and the public network node 201 indicates that the firewall is configured to access the public network. In an embodiment, the firewall is communicatively connected to a gateway, which is represented by a gateway node 203. In an embodiment, the gateway node 203 is connected to a load balancer node 204.

In some embodiments, the load balancer node 204 is connected a plurality of server nodes 205-1 through 205-N, where 'N' is an integer having a value of '2' or more, each server node representing a server deployed in the computing environment. In an embodiment, the server node 205-2 is connected to a database 206, which represents a database application installed on the server represented by server node 205-2.

In certain embodiment, a bucket 207 represents a bucket which is also detected in the computing environment. In an embodiment, an inspection of the bucket results in a detection of a data object, represented by data node 208. In an embodiment, the data node 208 is connected only to the bucket node 207, and the bucket node 207 is not connected to another node. Therefore, in some embodiments, the data node 208 is below the connectivity threshold, and is a potential stale object.

In some embodiments, a state is associated with a representation. For example, in an embodiment, the state of the data object represented by the data node 208 is determined based on an event log of access to the bucket represented by the bucket 207. In an embodiment, where it is determined that the number of access events is below a threshold, the data object is determined to be a stale object.

According to an embodiment, the data object represented by the data node 208 is inspected to determine a type of object. For example, a data object is inspected to determine if the data object is PII, PCI, PHI, other sensitive data, a combination thereof, and the like. In an embodiment, a cybersecurity risk is determined based on the data object represented by the data node 208.

Figure 3:
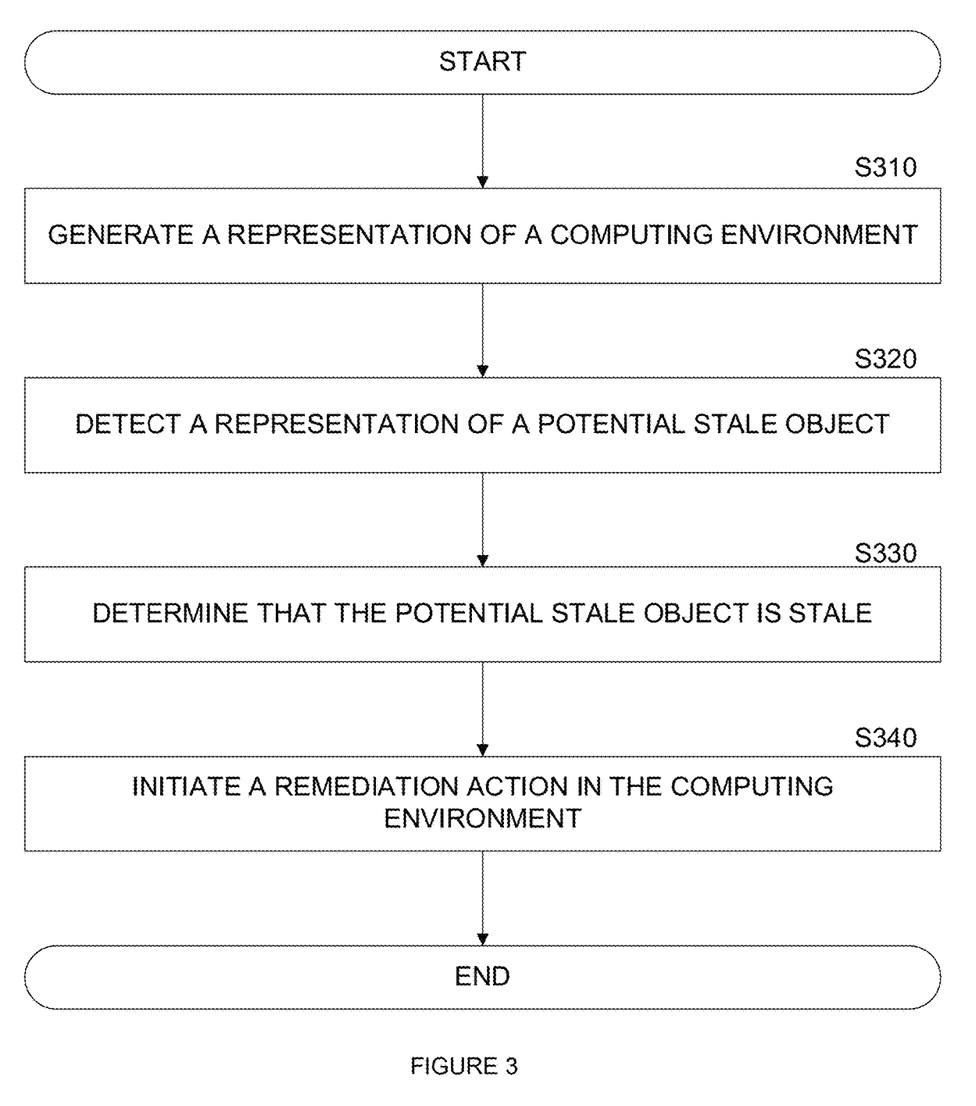
FIG. 3 is an example flowchart of a method for detecting stale objects in a computing environment based on a security database, implemented in accordance with an embodiment.

FIG. 3 is an example flowchart of a method for detecting stale objects in a computing environment based on a security database, implemented in accordance with an embodiment. In an embodiment, a stale object is an underutilized object.

At S310, a representation of a computing environment is generated. In an embodiment, a representation of a computing environment is generated based on: a result of an inspection, a result of network discovery, a result of insight generation, accessing an environment log, a runtime event, runtime execution data, static analysis, a combination thereof, and the like.

In an embodiment, a representation of a computing environment is stored in a security database, for example based on a unified data schema. In certain embodiments, the representation is a graph-based representation, including nodes representing resources, principals, enrichments, cybersecurity risks, cybersecurity objects, data objects, API endpoints, a combination thereof, and the like. In an embodiment, the representation includes a representation of a single computing environment, of a cloud computing environment, of a plurality of cloud computing environments, of a plurality of cloud computing environments each of which deployed on a unique cloud computing infrastructure, a combination thereof, and the like.

At S320, a potential stale object is detected. In an embodiment, a stale object is an object represented in the security database. For example, in an embodiment, a stale object is a representation of a resource, a representation of a principal, a representation of a data object, a combination thereof, and the like.

According to an embodiment, a potentially stale object is an object which is infrequently accessed, not accessed at all, not utilized in the computing environment, and the like. In an embodiment, a security database is periodically queried to detect potentially stale objects, for example based on predefined queries.

In certain embodiments, an object is determined to be stale based on a number of representations connected to the representation of the object. For example, according to an embodiment, a dangling object in the graph is an object (i.e., representation), which is not connected to another object (i.e., another representation of an object). For example, a data object which is connected only to a bucket on which it is stored is a potential stale object.

At S330, a potential stale object is determined to be a stale object. In some embodiments, a state is determined for an object represented in the security database. In certain embodiments, the state is determined based on an environment log, cloud log, network access log, filesystem access log, a runtime event log, a combination thereof, and the like.

In an embodiment, the state includes a behavior pattern generated, for example, based on events having an identifier corresponding to the entity. For example, in an embodiment, a state is generated based on events having an identifier corresponding to a cloud entity, such as a bucket.

In certain embodiments, a state is determined for a potential stale object. For example, in an embodiment, the state is determined once the security database is queried to detect potential stale objects. In some embodiments, the state indicates that an object is accessed infrequently, below a predetermined frequency, below a frequency which is based on an access type, etc. For example, an access type may be a maintenance access which is initiated by a cloud platform provider, and not by an actual principal or resource of the computing environment. Such access may be discounted and the potential stale object is indeed a stale object.

At S340, a remediation action is initiated. In an embodiment, the remediation action is initiated in the computing environment. In some embodiments, the remediation action includes generating an alert, generating a notification, updating a severity of an alert, generating a ticket in an issue tracking system, revoking access to a resource, revoking access from a principal, deprovisioning a resource, deleting a data object, a combination thereof, and the like.

In an embodiment, the remediation action is initiated based on the type of stale object. For example, in an embodiment, a data object that is determined to be a sensitive data object (e.g., a PII) includes a first remediation action, while a stale object which is a bucket that is not utilized includes a second remediation action.

In certain embodiments, a stale object is addressable by a plurality of remediation actions, each corresponding to a different computing environment, different portion of the computing environment, different controls of the computing environment, etc. For example, a first remediation action is performed in the control plane of a cloud computing environment, while a second remediation action is performed in a data plane of the cloud computing environment.

In an embodiment, a mitigation action includes removing the stale object from a first environment to a second environment. For example, in an embodiment, a stale object is moved from a cloud storage of a first type, to a cloud storage of a second type. In some embodiments, the cloud storage of the first type is more expensive than the cloud storage of the second type.

Figure 4:
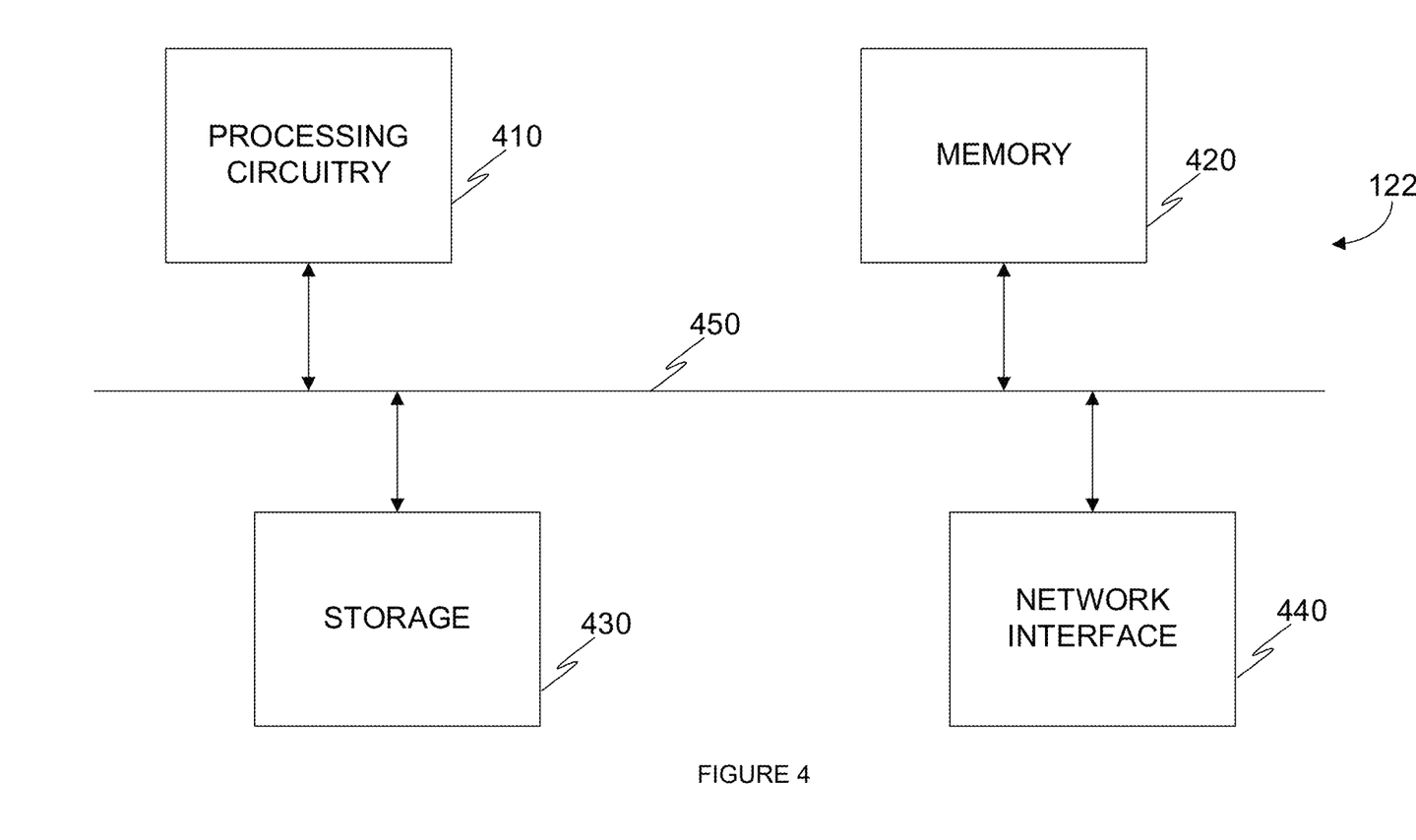
FIG. 4 is an example schematic diagram of a inspection controller according to an embodiment.

FIG. 4 is an example schematic diagram of a inspection controller 122 according to an embodiment. The inspection controller 122 includes, according to an embodiment, a processing circuitry 410 coupled to a memory 420, a storage 430, and a network interface 440. In an embodiment, the components of the inspection controller 122 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspection controller 122 with communication with, for example, the computing environment 110, the inspector 124, the active inspector 126, the security database 128, a combination thereof, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the inspector 124, the active inspector 126, the security database 128, the inspection controller 122, and any combination thereof, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting underutilized objects in a cloud computing environment, comprising:
    detecting a plurality of resources deployed in a cloud computing environment;
    generating for each resource a representation in a security database, the security database including a representation of the cloud computing environment;
    generating for each resource a state, based at least on a detected utilization of a respective resource;
    detecting, based on the state, a resource of the plurality of resources which is an underutilized resource; and
    initiating a mitigation action to disable a permission associated with a principal of the resource on the underutilized resource.

2. The method of claim 1, further comprising:
    generating in the security database an edge connecting a first representation to a second representation, based on at least a detected permission.

3. The method of claim 2, further comprising:
    detecting the underutilized resource in the security database based on a number of edges of a representation of the underutilized resource.

4. The method of claim 2, further comprising:
    detecting a group of representations in the security database wherein each representation of the group is not connected to a representation outside of the group; and
    detecting the underutilized resource in the group of representations.

5. The method of claim 4, further comprising:
    determining that a number of representations in the group of representations is below a first threshold; and
    determining that each resource represented in the group of representations is an underutilized resource.

6. The method of claim 5, further comprising:
    initiating a mitigation action on each resource represented in the group of representations.

7. The method of claim 1, further comprising:
    detecting a utilization of a resource based on an event log, the event log including a plurality of events, each event stored as a data record, at least a portion of which include an identifier of a resource.

8. The method of claim 1, further comprising:
    initiating the mitigation action to deprovision the underutilized resource.

9. The method of claim 1, further comprising:
    initiating the mitigation action to move the underutilized resource to a second computing environment.

10. A non-transitory computer-readable medium storing a set of instructions for detecting underutilized objects in a cloud computing environment, the set of instructions comprising:
    one or more instructions that, when executed by one or more processors of a device, cause the device to:
        detect a plurality of resources deployed in a cloud computing environment;
        generate for each resource a representation in a security database, the security database including a representation of the cloud computing environment;
        generate for each resource a state, based at least on a detected utilization of a respective resource;
        detect, based on the state, a resource of the plurality of resources which is an underutilized resource; and
        initiate a mitigation action to disable a permission associated with a principal of the resource on the underutilized resource.

11. A system for detecting underutilized objects in a cloud computing environment comprising:
    a processing circuitry;
    a memory, the memory containing instructions that, when executed by the processing circuitry, configure the system to:
    detect a plurality of resources deployed in a cloud computing environment;
    generate for each resource a representation in a security database, the security database including a representation of the cloud computing environment;
    generate for each resource a state, based at least on a detected utilization of a respective resource;
    detect, based on the state, a resource of the plurality of resources which is an underutilized resource; and initiate a mitigation action to disable a permission associated with a principal of the resource on the underutilized resource.

12. The system of claim 11, wherein the memory contains further instructions which when executed by the processing circuitry further configure the system to:
generate in the security database an edge connecting a first representation to a second representation, based on at least a detected permission.

13. The system of claim 12, wherein the memory contains further instructions which when executed by the processing circuitry further configure the system to:
detect the underutilized resource in the security database based on a number of edges of a representation of the underutilized resource.

14. The system of claim 12, wherein the memory contains further instructions which when executed by the processing circuitry further configure the system to:
detect a group of representations in the security database wherein each representation of the group is not connected to a representation outside of the group; and
detect the underutilized resource in the group of representations.

15. The system of claim 14, wherein the memory contains further instructions which when executed by the processing circuitry further configure the system to:
determine that a number of representations in the group of representations is below a first threshold; and
determine that each resource represented in the group of representations is an underutilized resource.

16. The system of claim 15, wherein the memory contains further instructions which when executed by the processing circuitry further configure the system to:
initiate a mitigation action on each resource represented in the group of representations.

17. The system of claim 11, wherein the memory contains further instructions which when executed by the processing circuitry further configure the system to:
detect a utilization of a resource based on an event log, the event log including a plurality of events, each event stored as a data record, at least a portion of which include an identifier of a resource.

18. The system of claim 11, wherein the memory contains further instructions which when executed by the processing circuitry further configure the system to:
initiate the mitigation action to deprovision the underutilized resource.

19. The system of claim 11, wherein the memory contains further instructions which when executed by the processing circuitry further configure the system to:
initiate the mitigation action to move the underutilized resource to a second computing environment.

* * * * *